United States Patent
Zoppi

Patent Number: 5,372,684
Date of Patent: Dec. 13, 1994

[54] PROCESS FOR THE DIRECT ELECTROCHEMICAL REFINING OF COPPER SCRAP

[75] Inventor: Gianni Zoppi, Dino di Sonvico, Switzerland

[73] Assignee: Ecochem Aktiengesellschaft, Triesen, Liechtenstein

[21] Appl. No.: 70,866

[22] Filed: Jun. 3, 1993

[30] Foreign Application Priority Data

Jun. 3, 1992 [CH] Switzerland ............ 01790/92

[51] Int. Cl.⁵ .................................................. C25C 1/12
[52] U.S. Cl. ................................................... 204/107
[58] Field of Search ............... 204/108, 106, 107; 75/743, 740; 205/291

[56] References Cited

U.S. PATENT DOCUMENTS

| | | | |
|---|---|---|---|
| 3,884,782 | 5/1975 | Pittman et al. | 204/108 |
| 3,901,776 | 8/1975 | Kruesi et al. | 204/107 |
| 3,926,752 | 12/1975 | Loretto et al. | 204/107 |
| 5,039,337 | 8/1991 | Olper et al. | 75/725 |

FOREIGN PATENT DOCUMENTS

2133806  8/1984  United Kingdom ........... C23F 1/00

OTHER PUBLICATIONS

The Encyclopedia of Electrochemistry, Clifford A. Hampel, Ed., Reinhold Publishing Corporation, New York 1964 pp. 245–246.

*Primary Examiner*—John Niebling
*Assistant Examiner*—Brendan Mee
*Attorney, Agent, or Firm*—Cushman Darby & Cushman

[57] ABSTRACT

Copper scrap, reduced to particulate form having particle sizes not larger than 50 mm, is leached in a suitable apparatus with a solution of ferric fluoroborate in fluoroboric acid. During leaching, copper is dissolved, with ferric fluoroborate simultaneously being reduced to ferrous fluoroborate according to the following reaction:

$$2\ Fe(BF_4)_3 + Cu \rightarrow Cu(BF_4)_2 + 2\ Fe(BF_4)_2 \qquad (1)$$

The resulting solution is fed to the cathodic compartment of diaphragm cell, in which copper is deposited, in compact and highly pure form, on a stainless steel cathode, from which it is periodically recovered.

8 Claims, 1 Drawing Sheet

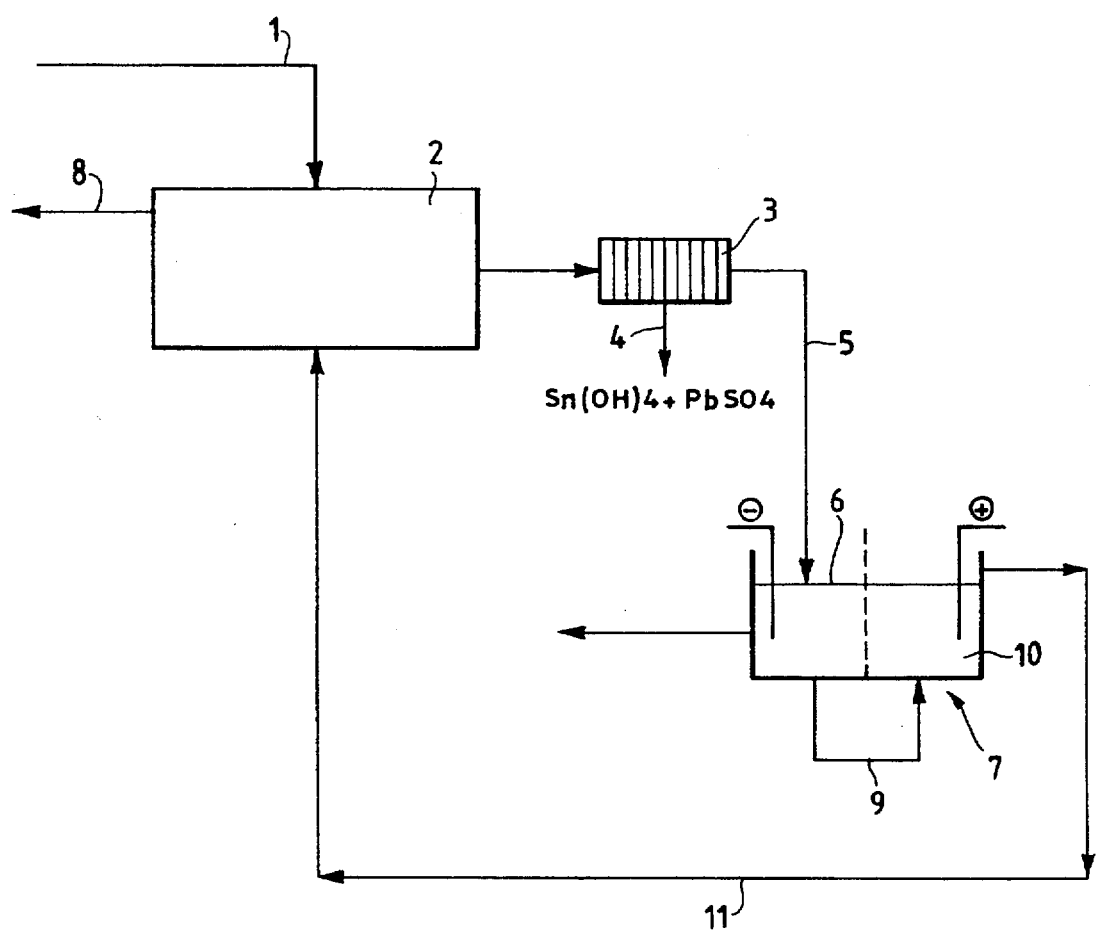

PROCESS FOR THE DIRECT ELECTROCHEMICAL REFINING OF COPPER SCRAP

BACKGROUND OF THE INVENTION

The present invention relates to a process for purifying copper contained in machining scraps and wastes, with those melting processes being eliminated which heretofore were believed to be essential in order to prepare suitable anodes for electrolytic refining from such scrap and waste material.

As known, electrolytic copper refining is carried out in cells into which massive anodes are installed which are manufactured by melting copper scraps, and casting the molten mass into suitable moulds, and into which cathodes are also installed, which are constituted by copper sheets or stainless steel sheets and onto which cathodes onto which refined copper is deposited owing to the effect of the electrical field generated between anode and cathode.

The electrolyte is generally constituted by an aqueous solution of copper sulfate containing free sulfuric acid, with the addition of additives in order to obtain a deposit with good characteristics.

The massive anodes of known type suffer from several drawbacks and limitations of practical character: first of all, the anodes, which get consumed, have to be removed after preestablished time periods, with the manufacturing cycle having thus to be interrupted.

Furthermore, the so-said "anodic residues", which constitute from 15 to 25% of the original metal weight, must be melted again, and this is a further burden.

The anodic sludges get often detached from the anodes and settle on the bottom of the electrolytic cell and must be removed from time to time; furthermore, these sludges may disperse throughout the bath and constitute a polluting agent for deposited copper.

It must be remarked, then, that the anodes to be refined must contain limited levels of certain impurities (Pb, Sn, Fe, O) and normally must undergo a refining process, with the consequent scorification of 7–10 parts of copper per each part of impurities to be eliminated.

The presently used refining system with massive anodes of polluted metal displays the feature that the anodic surface is very close to the cathodic surface, with current density value, expressed as $A/m^2$, consequently being very similar at both electrodes.

It derives that the cathodic current density cannot be increased and therefore, summing-up, the production capacity of the facility cannot be increased beyond certain limits, in order to prevent anodes from being passivated or cathodic deposits with poor quality being obtained.

The presence of sludges which get detached from the anode prevent the use of techniques which increase the copper diffusion coefficient in the cathodic double layer.

Most electrolytic copper refineries presently existing are operated with a cathodic density of about 200 $A/m^2$; only those which have adopted the so-said "PRC" (periodical reverse current) technique can exceed 300 $A/m^2$.

Summing-up, the refining system with massive anodes suffers from a large number of electrochemical limits, requires melting and thermal refining furnaces, a complex casting system, a complex handling of new anodes and anodic residues.

This type of facility cannot be operated on a small scale for economic reasons, so copper scrap has to be transported from a large number of different generation sites to a small number of large treatment facilities, with high transport costs.

SUMMARY OF THE INVENTION

In practicing the present invention, copper scrap is refined by being dissolved without any preliminary treatment, possibly apart from a simple size reduction.

According to the present invention, the serious problems which affect the prior art as reminded above, are overcome which obviates the need for melting furnaces, casting systems, complex handling procedures, and so forth, due to adoption of a much simpler process.

In order to accomplish such purposes and still other advantages which will be better clarified in the following disclosure, the present invention provides a process for the direct refining of copper scrap, characterized in that the process comprises the following steps:

(a) copper scrap is leached with a solution of ferric fluoroborate in fluoroboric acid, with copper being dissolved according to the reaction:

$$2Fe(BF_4)_3 + Cu \rightarrow 2Fe(BF_4)_2 + Cu(BF_4)_2$$

(b) the resulting solution is filtered,
(c) the filtered solution is fed to an electrolytic cell of diaphragm type in which copper is deposited in pure form at the cathode and ferrous ions are oxidized to ferric ions at the anode, with the solution of ferric fluoroborate being thus regenerated,
(d) the so regenerated ferric fluoroborate solution is recycled to step (a) in order to leach further amounts of copper scrap.

In leaching step (a), the less noble metal or metals than copper contained as impurities in the scrap, mainly Pb and Sn, are dissolved. Lead can be controlled by means of small additions of sulfuric acid, which precipitates it as lead sulfate; and tin is oxidized by the solution, yielding tetravalent Sn ion $Sn^{4+}$, which then precipitates as stannic hydroxide. Nobler impurities than copper are not dissolved.

The leaching step is preferably carried out at a pH value lower than 1, and a temperature within the range of from 20° to 65° C. The leaching solution may also contain ferrous fluoroborate, cupric fluoroborate, sulfuric acid, the latter in a proportional (i.e., stoichiometric) amount to the lead contained in the scrap.

After being filtered, the solution is fed to the cathodic compartment of an electrochemical cell of diaphragm type, in which copper is deposited on a matrix of either copper or stainless steel, in a very pure and compact form. The electrolyte, depleted of copper, is sent to the anodic compartment in which ferrous fluoroborate is oxidized to ferric fluoroborate, with the oxidizing power of the same leaching solution being restored.

According to the present invention, a system is thusly provided which is not a batchwise one, as the case for the systems known from the prior art, so that periodically removing the partially consumed anodes from the cell in order to replace them with new anodes is no longer necessary.

In that way, those dead times for anode extraction and replacement as necessary according to the prior art are eliminated, with a practically uninterrupted refining cycle being made possible, because the anodes contemplated in the present invention are insoluble and hence permanently installed inside the cell.

The copper scrap to be refined must be in the form of small-size scrap pieces, fragments or drops with particle sizes preferably not larger than 50 mm, still more preferably not larger than 20 mm. The fragments or small pieces of metal to be refined are charged in bulk to a dissolver for the leaching reaction, which can be an empty column through which the leaching solution is continuously circulated from bottom upwards so that, with the dissolution taking place from bottom, the column level continues to decrease, thus allowing fresh scrap to be charged, which meets with the solution which is becoming more and more exhausted as for oxidizing power, and more and more enriched with copper.

At the outlet from the column, the solution will have an oxidizing potential determined by the ratio of $Fe^{3+}/Fe^{2+}$, which is such as to be in equilibrium with the potential of $$Cu - 2e = Cu^{++}$$

reaction.

The solution, after being filtered in order to remove any possible suspended matter, is continuously fed to the electrolytic cell for copper to be deposited according to said step (c).

Copper scrap can be dissolved also by means of other systems, such as stirred reactors or revolving reactors, so as to secure an intimate contact between the solution and the material to be leached.

BRIEF DESCRIPTION OF THE DRAWING

The present invention is more fully disclosed hereinbelow as regards its practical aspects, by the following example, in which reference is made to the flow schematic diagram which is provided the accompanying drawing, which in no way shall be construed as being limitative of the invention.

DETAILED DESCRIPTION

Prior art

According to the electrolytic refining process carried out with traditional anodes, copper scrap obtained by grinding coated cables and subsequent sizing in air and on vibrating table, constitute a high quality material suitable for obtaining electrolytic copper.

Normally, this type of scrap contains a low Pb (0.5–1%) or Sn (up to 0.2%) level, and copper purity may reach 99%.

Notwithstanding the very good quality of this scrap, in order to produce suitable anodes for electrolysis according to the traditional process, scrap must be melted and submitted to an expensive refining process in order to oxidize Pb and Sn until a lead level lower than 0.2% is reached.

During this operation, besides the indicated impurities, also from 7 to 10 copper parts get oxidized per each impurity part and must be recycled to a reduction unit, such as a shaft furnace.

Present invention

EXAMPLE

In a test carried out by using the process of the present invention, copper wire scrap was used which derived from cable grinding and contained 2.3% Pb and 0.25% Sn.

With reference to the figure of the accompanying drawing, this scrap coming from 1 was leached in 2, inside a column, with a solution composed of ferric fluoroborate and fluoroboric acid, with an insoluble residue 8 being obtained. After being filtered in 3, with the insoluble portions 4 being separated, the solution 5, enriched with copper up to 30 g/l, was sent to the cathodic compartment 6 of a electrolytic cell 7 in which, during 5 days of electrolysis, on a stainless steel plate, a layer of electrolytic copper of 3 mm of thickness was deposited, which was of very good quality and in particular contained less than 10 ppm of total metal impurities.

The threshold value imposed by the presently applicable standards for copper cathodes of 65 ppm of total impurities.

The so copper; depleted solution 9 was sent to the anodic compartment 10 of cell 7, inside which, on a graphite anode, ferrous fluoroborate was oxidized to ferric fluoroborate, which was recycled by means of 11 to the leaching column 2.

The electrochemical reactions which took place inside the cell may be represented as follows:

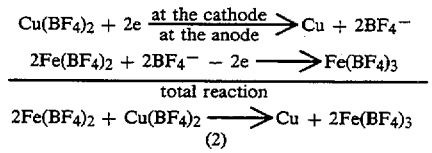

The oxidizing power was so restored of the solution, which was returned back to the leaching step where still fresh copper scrap was continuously dissolved.

From a more general viewpoint, one of the main elements which characterize the invention is the use of fluoroborate electrolyte in step (a).

Contrarily to other acids used for copper deposition according to the prior art, as, mainly, sulfuric acid, this electrolyte displays the characteristic of complexing the metal ions present in solution, with a complexing power which is proportional to the ion charge density.

This feature is of basic importance in the present invention. In fact, on the one hand, depositing a metal from a complex makes it possible for better deposits to be obtained, with a finer crystal grain and hence with smaller inclusions of impurities in the deposited matter; and, on the other hand, the strong complexing power of $BF_4^-$ ion for $Fe^{3+}$ ion, with complexes of $[Fe(BF_4)_3]_{3+n}{}^{n-}$ type being formed, prevents iron in oxidized form from passing from the anodic compartment, through the diaphragm, into the cathodic compartment in which, should that happen, the deposit would be dissolved with serious consequences for the current efficiency and consequently of energy consumption per each deposited copper unit.

I claim:

1. A process for direct refining of copper scrap, comprising:
   (a) leaching copper scrap using an acidic leaching solution of ferric fluoroborate in fluoroboric acid, with copper in the scrap thereby being dissolved according to the reaction:

$$2\ Fe(BF_4)_3 + Cu \rightarrow 2Fe(BF_4)_2 + Cu(BF_4)_2$$

(b) filtering the resulting solution,
(c) feeding the filtered solution to a diaphragm-type electrolytic cell having an anode and a cathode, in which copper is deposited from the filtered solution in pure form at the cathode and ferrous ions are oxidized to ferric ions at the anode, with said solution of ferric fluoroborate being thus regenerated,
(d) recycling the so regenerated ferric fluoroborate solution to step (a) in order to leach further amounts of copper scrap.

2. The process according to claim 1, wherein:
copper scrap to be leached in step (a) is first submitted to a particle size reduction so as to have only sizes smaller than 50 mm.

3. The process according to claim 1, wherein:
said acidic solution of ferric fluoroborate also contains ferrous fluoroborate and cupric fluoroborate.

4. The process according to claim 3, wherein:
said acidic solution of ferric fluoroborate also contains sulfuric acid.

5. The process according to claim 4, wherein:
said copper scrap contains SN and Pb which, in step (a) precipitate as $Sn(OH)_4$ and $PbSO_4$ respectively, said process further comprising removing said precipitate from the solution in step (b).

6. The process according to claim 4, wherein:
said scrap contains lead and said solution of ferric fluoroborate in fluoroboric acid contains sulfuric acid in an amount which is stoichiometric in relation to the lead level in the scrap.

7. The process according to claim 1, wherein:
step (a) is carried out at a pH value lower than 1, at a temperature within the range of from 20° to 65° C.

8. The process according to claim 1, wherein:
for oxidizing ferrous ions to ferric ions in said electrolytic cell of said step (c), said anode is made of graphite.

* * * * *